US012115865B2

(12) United States Patent
Hanis et al.

(10) Patent No.: US 12,115,865 B2
(45) Date of Patent: Oct. 15, 2024

(54) METHOD FOR SECURE MONITORING OF THE FUNCTION OF AN ELECTROMAGNETIC TRANSPORTATION DEVICE (71) Applicant: B&R INDUSTRIAL AUTOMATION GMBH, Eggelsberg (AT)

(72) Inventors: Gerhard Hanis, Eggelsberg (AT); Andreas Mayrhofer, Eggelsberg (AT)

(73) Assignee: B&R INDUSTRIAL AUTOMATION GMBH, Eggelsberg (AT)

(*) Notice: Subject to any disclaimer, the term of this patent is extended or adjusted under 35 U.S.C. 154(b) by 373 days.

(21) Appl. No.: 17/294,826

(22) PCT Filed: Nov. 19, 2019

(86) PCT No.: PCT/EP2019/081795
§ 371 (c)(1),
(2) Date: May 18, 2021

(87) PCT Pub. No.: WO2020/104454
PCT Pub. Date: May 28, 2020

(65) Prior Publication Data
US 2021/0402881 A1    Dec. 30, 2021

(30) Foreign Application Priority Data

Nov. 19, 2018   (EP) .................................. 18207059

(51) Int. Cl.
*B65G 43/02*   (2006.01)
*B60L 3/00*    (2019.01)
(Continued)

(52) U.S. Cl.
CPC .............. *B60L 3/0061* (2013.01); *B60L 3/12* (2013.01); *B60L 13/03* (2013.01); *B60L 15/005* (2013.01);
(Continued)

(58) Field of Classification Search
CPC .......... B60L 3/0061; B60L 3/12; B60L 13/03; B60L 15/005; B60L 2240/12; B60L 2240/14; B65G 43/02
See application file for complete search history.

(56) References Cited

U.S. PATENT DOCUMENTS

| 5,835,886 A | 11/1998 | Scheil |
| 9,202,719 B2 | 12/2015 | Lu et al. |

(Continued)

FOREIGN PATENT DOCUMENTS

| AT | 519 238 | 5/2018 |
| CN | 103354797 | 10/2013 |

(Continued)

OTHER PUBLICATIONS

Int'l Search Report (Form PCT/ISA/210) conducted in PCT/EP2019/081795 (Feb. 14, 2020) (w/ English translation).

(Continued)

*Primary Examiner* — Cortez M Cook
(74) *Attorney, Agent, or Firm* — GREENBLUM & BERNSTEIN, P.L.C.

(57) ABSTRACT

In order to implement a secure monitoring function for a long-stator linear motor or planar motor, the invention proposes that at least one first measurement value of a first sensor is compared to a predefined plausibility threshold value, and in the event of said plausibility threshold value being exceeded by the first measurement value, an error is identified and an action is triggered.

19 Claims, 7 Drawing Sheets (51) Int. Cl.
    *B60L 3/12* (2006.01)
    *B60L 13/03* (2006.01)
    *B60L 15/00* (2006.01)

(52) U.S. Cl.
    CPC ....... *B60L 2240/12* (2013.01); *B60L 2240/14* (2013.01)

(56) References Cited

U.S. PATENT DOCUMENTS

| | | | |
|---|---|---|---|
| 9,806,647 | B2 | 10/2017 | Prüssmiere et al. |
| 10,554,102 | B2 | 2/2020 | Weber et al. |
| 2001/0028200 | A1 | 10/2001 | Hwang et al. |
| 2003/0230941 | A1 | 12/2003 | Jacobs |
| 2006/0108960 | A1* | 5/2006 | Tanaka ............ B25J 21/00 318/568.21 |
| 2008/0190166 | A1 | 8/2008 | Hahn et al. |
| 2009/0033272 | A1 | 2/2009 | Winterhalter et al. |
| 2012/0176075 | A1* | 7/2012 | Taka ............ G05B 19/27 318/685 |
| 2012/0249028 | A1 | 10/2012 | von Berg et al. |
| 2013/0313072 | A1 | 11/2013 | Van De Loecht et al. |
| 2016/0241173 | A1 | 8/2016 | Prüssmeier et al. |
| 2017/0344009 | A1* | 11/2017 | Wernersbach ....... G05D 1/0297 |
| 2017/0346379 | A1 | 11/2017 | Weber et al. |
| 2019/0077608 | A1* | 3/2019 | Huang ............ B65G 43/02 |
| 2020/0183350 | A1 | 6/2020 | Rummele-Werner et al. |

FOREIGN PATENT DOCUMENTS

| | | |
|---|---|---|
| DE | 10 2011 003 682 | 8/2012 |
| DE | 10 2016 125 240 | 6/2018 |
| EP | 1 128 241 | 8/2001 |
| EP | 3 251 986 | 12/2017 |
| EP | 3 460 610 | 3/2019 |
| JP | H04-319191 | 11/1992 |
| JP | H06-178586 | 6/1994 |
| JP | H07-66638 | 7/1995 |
| JP | H08-59139 | 3/1996 |
| JP | H08-098326 | 4/1996 |
| JP | H09-227038 | 9/1997 |
| JP | 2001-327189 | 11/2001 |
| JP | 2013-176214 | 9/2013 |
| WO | 96/13764 | 5/1996 |
| WO | 2005/109132 | 11/2005 |
| WO | 2011/001555 | 12/2012 |

OTHER PUBLICATIONS

Int'l Written Opinion (Form PCT/ISA/237) conducted in PCT/EP2019/081795 (Feb. 14, 2020) (w/ English translation).
Europe Search Report/Office Action conducted in counterpart Europe Appln. No. 18207059.9 (May 23, 2019).
Japan Office Action conducted in counterpart Japan Appln. No. 2021-526796 (Sep. 19, 2023).
China Search Report/Office Action conducted in counterpart China Appln. No. 201980076087.1 (Nov. 8, 2023).
Yuchi et al., Modern Sensing Technology and System, pp. 424-425 (Jun. 30, 2009).
Japan Office Action conducted in counterpart Japan Appln. No. 2021-526796 (Jan. 4, 2024).
Europe Search Report/Office Action conducted in counterpart Europe Appln. No. 19 802 198.2 (Oct. 24, 2023).

* cited by examiner

METHOD FOR SECURE MONITORING OF THE FUNCTION OF AN ELECTROMAGNETIC TRANSPORTATION DEVICE

The present invention relates to a method for securely monitoring the function of an electromagnetic transportation device in the form of a long stator linear motor or planar motor, wherein a number of sensors are arranged on the long stator linear motor or planar motor and the number of sensors each acquire a measurement value that is suitable for controlling the long stator linear motor or planar motor. The present invention also relates to an electromagnetic transportation device in the form of a long stator linear motor or planar motor, on which a number of sensors are arranged, which are connected to a control unit of the long stator linear motor or planar motor, and are designed to acquire a measurement value from the long stator linear motor and transmit it to the control unit.

In order to meet the requirements of modern, flexible logistics units, long stator linear motors (LLMs) are increasingly being used as a replacement for conventional continuous conveyors, for example rotary-to-linear conversion units such as rotary motors on a conveyor belt. Long-stator linear motors are characterized by a better and more flexible utilization over the entire working range. Thus, the ranges of the speed and acceleration from zero to the maximum can be utilized. Other advantages which must be mentioned include individual regulation or control of the movable transport units (shuttles), improved energy utilization, reduction of maintenance costs due to the lower number of wear parts, ease of replacement of transport units, efficient monitoring and easier fault detection, and optimization of the current consumed through the elimination of current gaps.

A stator of a long stator linear motor consists of a plurality of drive coils arranged next to one another in the direction of motion of the transport units. By activating the drive coils individually or in groups, a moving magnetic field is generated which cooperates with drive magnets (usually permanent magnets) on a transport unit of the LLM in order to generate a propulsion force acting on the transport unit and thus move the transport unit along the stator.

Since the drive magnets of a transport unit generate a magnetic field, the position of the transport unit can be determined by detecting this magnetic field. For this purpose, magnetic field sensors, which are based, for example, on the anisotropic magnetoresistive effect (AMR effect), can be built into the stator of the long stator linear motor. By detecting the magnetic field, conclusions can be drawn about the position and, subsequently, also about the speed of the transport unit. US 2003/230941 A1, for example, discloses a determination of the speed of transport units using magnetic field sensors.

AT 519 238 B1 discloses a determination of the position of a transport unit, which also functions when the transport unit is at a standstill. A magnetic field characteristic of a transport unit is considered here and analog sine and cosine signals are recorded as measurement values when the long stator linear motor is initialized. A magnetic field angle of the magnetic field acting on the measuring sensor can be calculated from the measurement values. In addition, information about the structural and geometrical structure of the transport unit is used, based on a determined rough position of the transport unit, to infer an exact position during the activation/initialization of the long stator linear motor.

A planar motor can also be provided as the electromagnetic transport device, for example. This means that the electromagnetic transport device is a planar motor. A planar motor can be used in a production process, for example, whereby very flexible transport processes with complex movement profiles can be implemented. In contrast to the long stator linear motor, a planar motor has a transport plane that is basically two-dimensional, for example lying in the yz-plane. The drive coils are distributed in the transport plane in order to generate a magnetic field which can be moved in two dimensions in the transport plane. The magnets are advantageously arranged so as to be distributed in a two-dimensional manner at the transport unit in order to interact with the magnetic field and move the transport unit in the transport plane. The drive coils and the magnets are advantageously arranged in such a way that, in addition to a one-dimensional movement along the axes spanned by the transport plane (y-axis and z-axis in a yz-plane), more complex two-dimensional movements of the transport unit in the transport plane are also possible. In principle, it is also possible that only a one-dimensional movement in the transport plane is provided. In this case, the magnets and drive coils can also be arranged only one-dimensionally. The mode of operation and structure of planar motors is known in principle and can be found in U.S. Pat. No. 9,202,719 B2, for example.

It may also be necessary to implement safety functions for a long stator linear motor or planar motor. For example, an error or an exceedance of a predefined limit must be detected during operation. A safe momentum lock STO (Safe Torque Off) can then be activated in order to initiate a safe state in which at least one route segment of the long stator linear motor is switched free of force. There is usually no active braking of the transport units located on the stator, so that transport units that are in motion coast down.

US 2009/033272 A1 discloses a safety concept which enables position determination. A feedback arrangement is provided which includes additional magnetic field sensors which, if the primary magnetic field sensors fail, provide information about the position of the transport unit. U.S. Pat. No. 9,806,647 B2 shows a safety module which separately calculates the position of a transport unit and checks whether it matches the position determined using magnetic field sensors.

It is therefore an object of the present invention to specify a secure monitoring function for an electromagnetic transportation device in the form of a long stator linear motor or planar motor.

This object is achieved according to the invention in that at least one first measurement value of a first sensor is compared with a predefined plausibility limit value and, if the plausibility limit value is crossed by the first measurement value, an error is identified and an action is triggered.

The object is also achieved by an evaluation unit which is designed to compare a first measurement value of a first sensor with a predefined plausibility limit value and to identify an error when the measurement value is crossed and to trigger an action. The secure evaluation unit is preferably designed to be independent of the control unit.

An existing measurement value can thus be checked for plausibility. A measurement value is fundamentally suitable for controlling the long stator linear motor or planar motor, but this does not necessarily mean that the measurement value is also used to control the long stator linear motor or planar motor. The sensors of the long-stator linear motor or planar motor can, for example, be connected to bus-compatible analog-digital converters which are controlled by a non-secure control part. Since the measurement values are not securely available in this case, a plausibility check of the measurement values of the sensors can be used to ensure that an error is detected. Since the detected error is responded to in the form of an action, secure control of the long-stator linear motor or planar motor is guaranteed.

The method according to the invention can be used for the entire long stator linear motor or planar motor, but also for part of the long stator linear motor or planar motor, preferably a route segment of the transport route of the long stator linear motor or a plane segment of the transport plane of the planar motor is used.

By comparing the measurement value with a predefined threshold value and determining whether the measurement value crosses the limit value and thus violates it, it can be determined whether the measurement value is plausible, i.e. whether the measurement value can even occur during operation of the long stator linear motor or planar motor. An upper limit value can be provided as the threshold value, so that if the upper threshold value is exceeded (crossed) by the first measurement value, an error is identified and an action is triggered. A lower limit value can also be provided as the threshold value, so that if the first measurement value falls below (crosses) the lower threshold value, an error is detected and an action is triggered. Of course, an upper and a lower threshold value can also be provided for a measurement value, which are checked for violation.

The predefined threshold value can be specified in various ways. For example, the predefined threshold value can correspond to a fixed value and/or can be predefined by a higher-level controller, for example on the basis of a specific (safety) setting. However, a distinction must be made between the predefined threshold value and operational threshold values. An operational or "normal operational" threshold value results depending on the operating state of the long stator linear motor or planar motor. For example, an error tolerance of a measurement value, for example tracking error monitoring, can be viewed as an operational threshold value. If a measurement value exceeds an operational threshold value, it is usually not a defect, but an application error. If, for example, a transport unit is to be accelerated at 3 m/s$^2$ (operational lower threshold value for the current operating state), however, due to the design of the power electronics of the control unit, only an acceleration of 2 m/s$^2$ (measurement value) results, a tracking error is detected because the measurement value is below the lower threshold. In this way, for example, a user error can be detected, but a defect cannot be inferred.

In contrast, a predetermined threshold value according to the invention is a plausibility threshold value which checks, for example, that the measurement value is fundamentally, for example physically, possible. The predefined threshold value must not be crossed by the measurement value if the long stator linear motor or planar motor is functioning correctly. If a predefined threshold value is exceeded, it can be concluded that there is a defect in the sensor, the signal transmission, the evaluation unit, etc. If, for example, an acceleration of 10 m/s$^2$ (measurement value) is determined, wherein the transport unit can have a maximum acceleration of 5 m/s$^2$ (predefined threshold value), an error is recognized according to the invention.

In summary, a measurement value can cross an operational threshold value even with properly functioning hardware, whereas a hardware fault can be inferred when a predefined threshold value is crossed within the meaning of the invention (plausibility threshold value).

According to the invention, the measurement value can thus be compared with a predefined threshold value for the present invention. In addition, the measurement value can of course also be compared in a known manner with an operational threshold value during operation.

If, for example, a speed of a transport unit is determined as a measurement value, then a maximum speed at which a transport unit can fundamentally be moved at a maximum can be determined. If the speed as a measurement value exceeds the maximum speed as a threshold value, an error is identified and an action is triggered.

Magnetic field sizes can be recorded as measurement values. The relevant sensor can thus represent a magnetic field sensor which measures a property of a magnetic field occurring at the sensor, for example the magnetic field intensity (e.g. a Hall sensor) or the direction of the magnetic field (e.g. a magnetoresistive sensor). Magnetostrictive sensors are also possible as magnetic field sensors.

The sensor can also represent a temperature sensor and record a temperature as a measurement value.

The first sensor is advantageously a current sensor. A coil current flowing through the drive coils can thus be viewed as a measurement value and compared with a threshold value.

Of course, a sensor can also supply several measurement values, for example a property of a magnetic field and a temperature. A temperature sensor is, for example, often integrated into a magnetic field sensor, since the measurement values determined by the magnetic field sensor are often influenced by the sensor temperature. In order to be able to take into account the degree of influence, the temperature can be recorded and processed as a further measurement value. Several measurement values can also be combined to form a new measurement value.

A rate of change over time of the first measurement value of the first sensor and/or a rate of change over time of a further measurement value of a further sensor is advantageously compared with a predefined maximum rate of change over time. If the maximum rate of change over time is exceeded, an error is identified and an action is triggered.

The dynamic of the measurement value is thus compared with a maximum dynamic as a threshold value. This limit value can, for example, be specified in advance on the basis of a provided sampling rate and/or a maximum expected signal frequency.

For example, a certain continuity can be assumed for a magnetic field angle and/or a magnetic field magnitude as a measurement value. For example, a rate of change over time of the magnetic field angle and/or the magnitude of the magnetic field can be determined, compared with a predefined maximum rate of change, and if exceeded, an error can be identified and an action can be triggered.

Likewise, it can also be assumed, for example, that no temperature changes occur above a certain maximum rate of change. If the temperature is viewed as a measurement value, then, for example, a rate of change of the temperature can be compared with a maximum value, and if exceeded, an error can be identified and an action can be triggered.

A check of the rate of change over time and a comparison with a predefined maximum rate of change can of course be carried out for all types of measurement values, e.g. for a speed, an acceleration, etc.

The first measurement value of the first sensor and/or a further measurement value of a further sensor can advantageously be compared with an additional measurement value of an additional sensor, which is preferably positioned adjacent to the first sensor and/or further sensor, and a difference can be identified. If the identified difference deviates from a predefined difference, preferably a predefined difference of zero, an error is identified and an action is triggered.

For example, the temperature as a measurement value of a first sensor can be compared with the temperature of a further sensor as a threshold value. Depending on the arrangement of the sensors on the stator, for example, an assumption can be made concerning the relationships between the temperature of the first sensor and the further sensor, wherein the assumption requires, for example, similar temperatures, i.e. a slight difference or no difference. If the deviation is too great, it can be concluded that there is a fault, for example in the first sensor or in the further sensor, and an action can be triggered. Similar assumptions can be made for other measurement values, such as magnetic field values, for example. It can thus be assumed that a measurement value (for example a magnetic field magnitude) does not deviate beyond a predefined tolerance, particularly for sensors positioned adjacent to it. Similarly, the magnetic field angle as a measurement value of a first sensor can also be compared with the magnetic field angle of a further sensor and a difference can be identified. This identified difference is compared with a predefined difference and, if there is a deviation, an error is determined and an action is triggered.

An activity of the first sensor is advantageously determined as the first measurement value and an activity of the additional sensor is determined as an additional measurement value. The activities are advantageously binary, i.e. there is the status active and inactive, wherein the boundary between active and inactive is able to be represented, for example, by a predefined magnetic field strength. The occurring activity of two sensors can thus be compared with given patterns. A match of the activity or an opposing activity can be viewed as a predefined difference in accordance with the predefined pattern in order to carry out a plausibility check with regard to the activity of the sensors under consideration. The output of an optical and/or acoustic warning signal or intervention in the control unit can be provided as an action. For example, a momentum block (STO) etc. can be triggered.

By comparing the measurement values with one another, it can be ensured that the measurement values are reliable. "Safe" can be defined according to a category in table 10 of the standard DIN EN ISO 13849-1:2016-06 and thus, depending on the safety category, single-fault safety, double-fault safety, etc. can be provided. Of course, sensors can also be used which already correspond to a safety category, wherein the measurement values additionally are evaluated according to the invention. For example, the activation of the analog-digital converter of the control unit can also be monitored, wherein the clock frequency and/or the number of cycles of the conversion, the frequency of the start of the conversion, etc. can be considered. The measurement values of all sensors of the long-stator linear motor or planar motor can advantageously be checked with a predefined threshold value and/or the rates of change of the measurement values of all sensors can be compared with a maximum rate of change over time and/or the measurement values of all sensors can be compared with the additional measurement values of other sensors.

In this way, it can be ensured in different ways that all measurement values of the long-stator linear motor or planar motor are plausible, that errors are inferred and that an action is triggered.

A transport unit is advantageously arranged movably in a direction of movement along a transport route, wherein a plurality of drive magnets arranged at the transport unit in the direction of movement generates a magnetic field at the transport route. The measurement value of at least one sensor is also dependent on the position and/or the speed and/or the acceleration of the transport unit at the transport route. This arrangement applies to a long stator linear motor as a transportation device.

A transport unit is advantageously arranged movably in a transport plane, wherein a plurality of drive magnets arranged at the transport unit generate a magnetic field at the transport plane. The measurement value of at least one sensor is also dependent on the position and/or the speed and/or the acceleration of the transport unit at the transport plane. This arrangement applies to a planar motor as a transportation device.

If the sensor directly supplies the position or speed or acceleration as a safe measurement value, a safe position or safe speed or safe acceleration can be formed. In this case, a sensor can deliver a "safe" measurement value. In order to maintain the safe position or speed or acceleration, depending on the safety requirements, it may also be necessary that the entire chain of evaluating the measurement values from the sensor to the processing processors is safe in order to ensure safe communication between the respective components. Any sensors that deliver a signal proportional to the position or speed or acceleration of the transport unit are therefore conceivable as corresponding sensors. Optical sensors, Hall sensors, light barriers, etc. or sensors for utilizing the Doppler effect, such as radar sensors, laser sensors, sound sensors, etc., can be provided.

However, a safe position and/or a safe speed and/or a safe acceleration of the transport unit can also be determined from the safe measurement value. The mere presence of a transport unit on the transport route or on the transport plane can also be viewed as a safe (rough) position.

Thus, for example, a position can also be determined using a magnetic field sensor as a sensor. A safe speed of the transport unit can also be determined from the safe position or from the course over time, for example by deriving the safe position over time. Likewise, a safe acceleration can be determined from the safe speed or the time profile of the safe speed.

The safe position and/or the safe speed and/or the safe acceleration can be determined in at least two redundant calculation paths. This means that checks and calculations are carried out separately in each redundant calculation path to determine the safe position or safe speed or safe acceleration of the transport unit. The redundant computation paths can be implemented by means of corresponding redundant computation units arranged for example in parallel.

The evaluation unit can thus be designed to also be safe. If no safe position or speed or acceleration can be determined from the measurement value or the measurement values, an error is recognized in the calculation, whereupon an action can be triggered according to a safety function. The output of a warning signal, triggering of a momentum block (STO), etc. can again be carried out as an action.

Intermediate results and/or results of the evaluations can be compared between the at least two redundant calculation paths. The measurement values and/or values that can be unambiguously assigned to the measurement values (for example CRC32 checksums or other algorithms such as SHA2, etc.) can also be compared between the at least two redundant calculation paths.

This ensures that the calculations in the redundant calculation paths are not subject to errors. If the (intermediate)

results of the redundant calculation paths differ, a fault in one calculation path can be assumed. In this case, an action can be triggered.

If several measurement values from several sensors are processed by the calculation units, the measurement values of the respective sensors can also be processed by the evaluation unit in such a way that errors with a common cause can be excluded. For example, sine signals and cosine signals of a sensor determined from the measurement values and/or measurement values from adjacently positioned sensors can be processed by different calculation units and/or converted into digital signals by different analog/digital converters.

The measurement value can be compared with a reference value, preferably with a reference curve, in order to determine the safe position and/or the safe speed and/or the safe acceleration.

A transport unit has drive magnets which emit a magnetic field characteristic of the transport unit along the arrangement of the drive magnets in the direction of movement. This characteristic magnetic field is regarded as a reference curve and can be known in advance or recorded. If magnetic field angles and/or magnetic field magnitudes are considered as measurement values, a characteristic curve of the magnetic field angle and/or the magnetic field magnitude is used as the reference curve.

Information known in advance, preferably information on the arrangement of the drive magnets and/or on the arrangement of the sensor, can be used to calculate the safe position and/or the safe speed and/or the safe acceleration.

By considering at least one measurement value from at least one sensor and comparing it with the reference curve, a plurality of possible positions of the transport unit can nonetheless result. In order to reduce these possible positions, information known in advance can be used to limit the possible combinations, as is fundamentally described in AT 519 238 B1. For example, a specified typical distance between the sensors can be used as information known in advance. An analysis of the magnetic field is therefore particularly possible if the transport unit, and thus also the magnetic plates of the transport unit, are guided along the stator in a defined, predefined position. An alignment of the magnetic plate, a distance between the magnetic plate and the stator, etc. can be viewed as position. Since the transport units are already guided at a defined distance and in a known orientation on the stator, this prerequisite with regard to the position is usually given. A reduction in the necessary computing time can thus be achieved, which is advantageous if the position/speed is to be checked quickly, preferably in real time. The measurement values of all active sensors are preferably used to determine the safe position of the transport unit. In order to determine active sensors, it is possible to determine which sensors have a sufficiently strong magnetic field acting on them. If all measurement values resulting from active sensors are used to determine the safe position and/or safe speed and/or safe acceleration, then a particularly high level of safety is given, since a malfunction of a sensor can be detected with a high degree of probability. In addition, a larger number of measurement values enables easier comparison with a reference curve.

The safe position and/or the safe speed and/or the safe acceleration of the transport unit can be compared with a predefined maximum value and if exceeded an action can be triggered.

A safe speed limit (Safely Limited Speed) can be ensured for the transport unit in question. This prevents the speed of the transport unit from exceeding a predefined (global or section-wise) speed limit, which could endanger people, e.g. through collisions with people, lifting of a transport unit from the stator in a curve, etc.

Fundamentally, not only a magnitude but also a direction can be viewed as speed. This means that the direction of the moving transport unit can be viewed as speed, which means that the direction of movement of the transport unit can be reliably determined.

The safe speed of the transport unit is advantageously determined independently of the direction. This means that the absolute speed of one, several or all of the transport units can be reliably determined.

Preferably the safe position and/or the safe speed and/or the safe acceleration of all transport units of the long stator linear motor or planar motor is/are determined. However, the highest occurring speed of all transport units located on the stator can also be determined first and then this value can be compared with the predefined threshold value.

For example, a safe speed limit (Safely Limited Speed) can be implemented for all transport units and thus for the entire long stator linear motor or planar motor.

A transport unit can be arranged movably in one direction of movement along a transport route, wherein a plurality of drive magnets arranged at the transport unit in the direction of movement generate a magnetic field at the transport route, wherein from the at least one first measurement value a propulsion force acting on the transport unit and/or on the safe normal force acting on the transport unit can be determined. This arrangement applies to a long stator linear motor as a transportation device.

A transport unit can be arranged movably along a transport plane, wherein a plurality of drive magnets arranged at the transport unit generate a magnetic field at the transport plane, wherein from the at least one first measurement value a propulsion force acting on the transport unit and/or a safe normal force acting on the transport unit can be determined. This arrangement applies to a planar motor as a transportation device.

If the sensor, e.g. a force sensor, directly supplies the normal force and/or propulsion force, the safe normal force and/or safe propulsion force can be formed directly, since the measurement value supplied by the sensor can be viewed as safe due to the application of the method according to the invention.

The normal force and/or propulsion force can also be determined from a measured coil current if a current sensor is used as the first sensor. In this case, a coil current is a directly physically measured variable of the first sensor, the normal force and/or propulsion force representing a variable derived from the coil current, which can be viewed as a measurement value. If the coil current is safe, the normal force and/or propulsion force can be reliably calculated. For the determination of the normal force and/or propulsion force, depending on the safety requirements, it may be necessary for the entire chain of evaluation of the measurement values from the sensor to the processing processors to be safe in order to ensure safe communication between the respective components.

A propulsion force acts on a transport unit along the transport route or along a transport plane in the direction of movement. If a propulsion force is determined as a measurement value, a maximum/minimum propulsion force can be specified as the threshold value. This ensures that the determined propulsion force does not exceed/fall below the maximum/minimum propulsion force.

A normal force acts on a transport unit normal to the direction of the transport route or normal to the transport plane. If a normal force is determined as a measurement value, a minimum/maximum normal force can be predefined as the threshold value. This ensures that the normal force determined does not fall below/exceed the minimum/maximum normal force. It can thus be ensured that the transport unit adheres securely to the transport route or to the transport plane. Also, for example, in the region of a switch that is provided at the transport route or at the transport plane, the normal force can be sufficient for the switch to function correctly.

A method for securely monitoring the function of a long stator linear motor or planar motor can also be specified, wherein a number of sensors is arranged on the long stator linear motor or planar motor and the number of sensors each acquires a measurement value for controlling the long stator linear motor or planar motor, wherein a rate of change over time of the first measurement value of the first sensor and/or a rate of change over time of a further measurement value of a further sensor is compared with a maximum rate of change over time, and if the maximum rate of change over time is exceeded, an error is identified and an action is triggered. In this method, the first measurement value of the first sensor is therefore not compared with a predefined threshold value.

A method for securely monitoring the function of a long stator linear motor or planar motor can also be specified, wherein a number of sensors is arranged at the long stator linear motor or planar motor and the number of sensors each acquire a measurement value for controlling the long stator linear motor or planar motor, wherein the first measurement value is the first sensor and an additional measurement value from an additional sensor, preferably adjacent to the first sensor, is compared and a difference is identified, wherein in the event of a deviation of the determined difference from a predefined difference, preferably from a predefined difference of zero, an error is determined and an action is triggered. In this method, the first measurement value of the first sensor is therefore not compared with a predefined threshold value.

In addition, a method for securely monitoring the function of a long stator linear motor or planar motor can be specified, wherein a number of sensors are arranged on the long stator linear motor or planar motor and the number of sensors each records a measurement value for controlling the long stator linear motor, a transport unit is movably arranged in a direction of movement along a transport route or along the transport plane, wherein a plurality of drive magnets arranged at the transport unit in the direction of movement generates a magnetic field at the transport route, wherein a measurement value of at least one sensor is dependent on the position and/or the speed and/or the acceleration of the transport unit at the transport route or at the transport plane, wherein a safe position and/or a safe speed and/or a safe acceleration are determined from the at least one measurement value of the transport unit.

This determination of the safe position and/or the safe speed and/or the safe acceleration can take place in at least two redundant calculation paths of an evaluation unit. Intermediate results and/or results of the evaluations are advantageously compared between the at least two redundant calculation paths. The at least one measurement value can be compared with a reference value, preferably a reference curve, in order to determine the safe position and/or the safe speed and/or the safe acceleration, wherein previously known information, preferably information on the arrangement of the drive magnets and/or on the arrangement of the at least one sensor can be used for calculating the safe position and/or the safe speed and/or the safe acceleration.

The safe position and/or the safe speed and/or the safe acceleration of the transport unit can be compared with a predefined threshold value, and if it is exceeded an action can be triggered. In this method, the first measurement value of the first sensor is therefore not compared with a predefined threshold value.

The method according to the invention enables predefined safety criteria for the long stator linear motor or planar motor or a part thereof, for example a route segment of the transport route or a plane segment of the transport plane. With a corresponding definition of these safety criteria, it can thus be ensured that an object or subject can interact directly with the long stator linear motor or planar motor. Advantageously, the function of a long stator linear motor or planar motor is monitored when an object or subject is in a predefined safety range of the long stator linear motor or planar motor or leaves a predefined working range of the long stator linear motor or planar motor. The safety functions according to the invention are thereby applied, for example in the cooperation between humans and a long-stator linear motor or planar motor. Safety functions can optionally be activated and/or deactivated when people are in predefined safety ranges or work ranges. Safety functions can also be activated/deactivated for route segments of the transport route or plane segments of the transport plane, especially in the presence of people in the region of the plane segments of the transport plane, whereas in other route segments or plane segments other safety functions are active/inactive. In this way more restrictive safety functions for route segments or plane segments in which people are present, for example, can be activated, whereas the remaining route segments or plane segments have less restrictive safety features.

In the following, the present invention is described in greater detail with reference to FIG. 1a to 6 which, by way of example, show schematic and non-limiting advantageous embodiments of the invention. In the drawings.

A long stator linear motor can be provided as electromagnetic transport device. That means that the electromagnetic transport device represents a long stator linear motor. FIG. 1a, 2, 3, 4, 6 each show a long stator linear motor 2 with an evaluation unit 3. The stator of the long stator linear motor 2 is designed here as a closed transport route 20. A plurality of drive coils L are arranged one after the other at the transport route 20 in the direction of movement r of a transport unit 1, each of which coils is energized in normal operation under the control of a control unit 4 at a coil current $i_m$ in order to generate a moving magnetic field. The coil current $i_m$ through the respective drive coils L can be fundamentally different from drive coil L to drive coil L. The control unit 4 can be in the form of suitable hardware and/or in the form of software running on suitable hardware. The drive coils L arranged next to one another in the movement direction r are arranged at the transport route 20 on a stationary support structure (only implied in the drawings). Depending on the application and as needed, the transport route 20 can have any shape, and can comprise closed and/or open route portions. The transport route 20 does not have to lie in one plane, but can also be guided in any way in space. Depending on the structure of the transport route 20, for example: in the case of a vertical transport route 20 or a vertical section of the transport route 20, safety functions can also be excluded. Usually a transport route 20 consists of several route segments put together, each with a number of drive coils L. Likewise, switches are known to guide a transport unit 1 from a first transport route 20 to a second transport route 20.

A number of sensors S1, S2, S3, S4 are arranged on the long stator linear motor, for example on the stator. A magnetic field sensor, for example, can be provided as the sensor S1, S2, S3, S4. Magnetic field sensors can be viewed as sensors which measure a property of a magnetic field, for example the magnetic field intensity (for example a Hall sensor) or the direction of the magnetic field (for example a magnetoresistive sensor).

A current sensor which determines the coil current $i_m$ through a drive coil L can also serve as sensor S1, S2, S3, S4. As is known, a normal force and/or propulsion force acting on a transport unit can be determined from the coil current $i_m$.

According to the invention, an evaluation unit 3 is provided which compares at least one measurement value m1 of a first sensor S1 (only a first sensor S1 is shown by way of example in FIG. 1) with a predefined threshold value G. Thus, the measurement value m1 of the sensor S1 is checked for plausibility, for example, and a deviation of the measurement value m1 from the target value G is identified and an action A is triggered. As action A, for example, a warning signal can be output and/or the control unit 4 of the long-stator linear motor can be intervened in, as indicated in FIG. 1a, 2, 3, 4, 6.

Figure 1A:
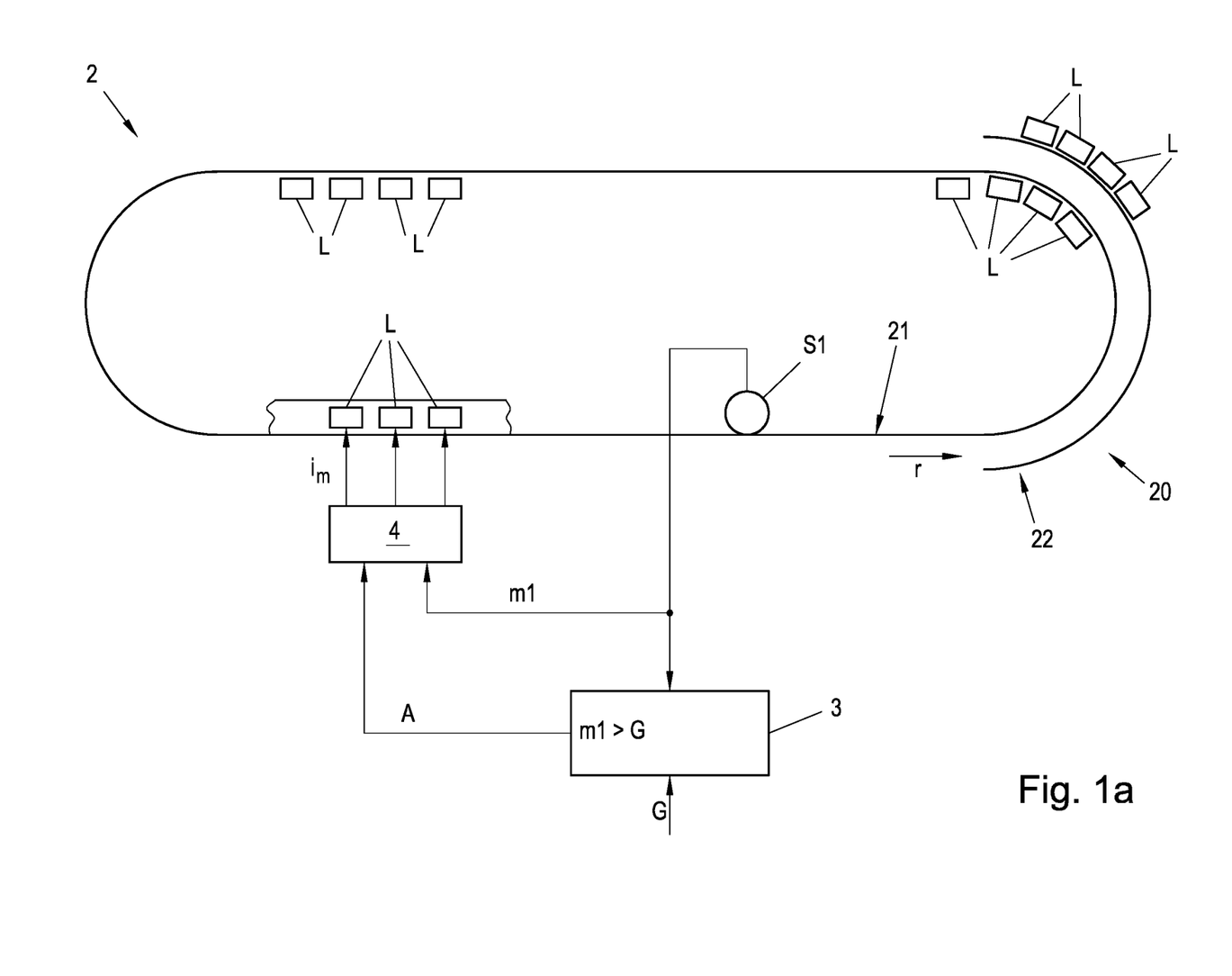
FIG. 1a shows the comparison of a first measurement value with a threshold value on a long stator linear motor.
Figure 1B:
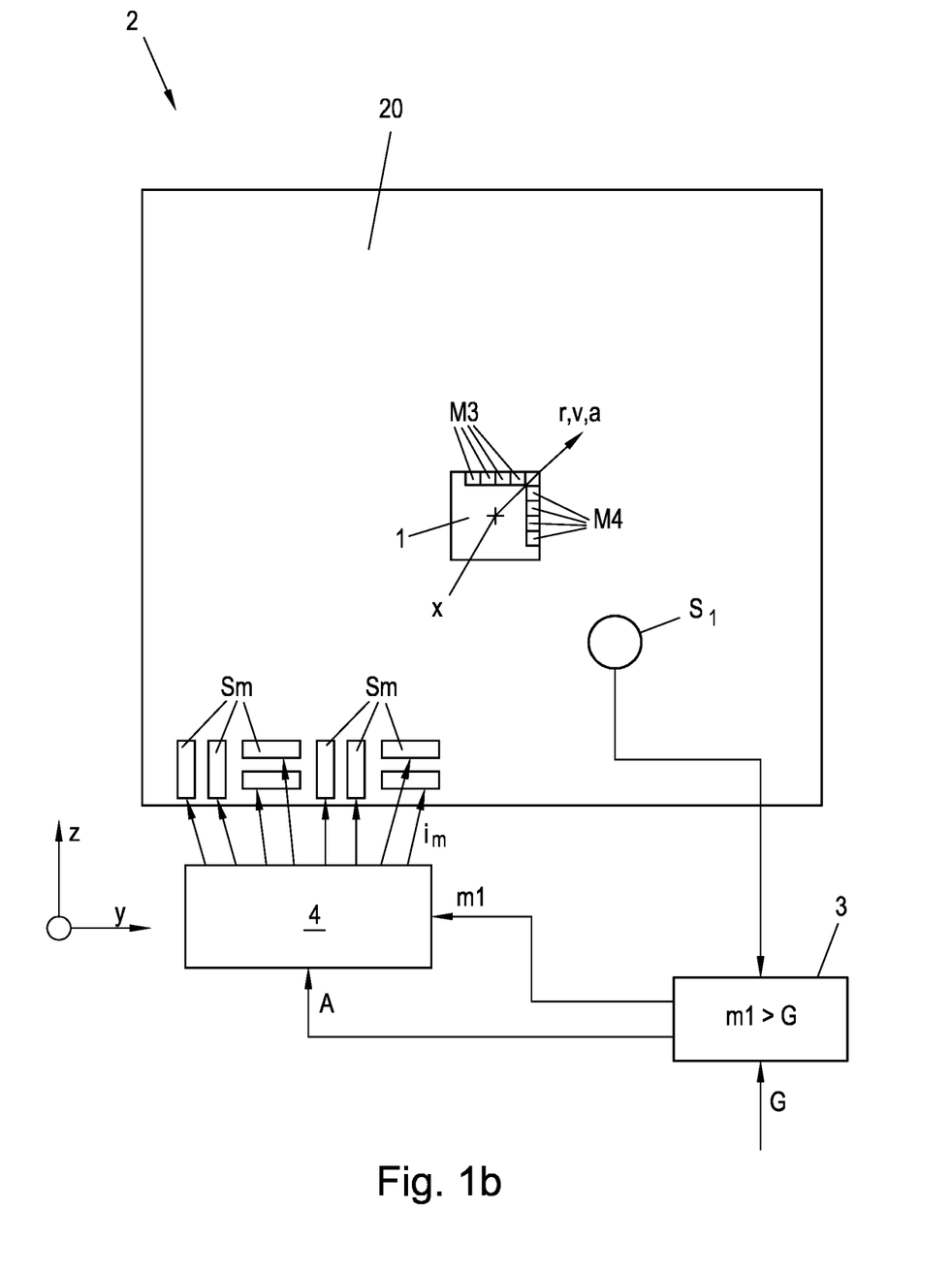
FIG. 1b shows the comparison of a first measurement value with a threshold value on a planar motor.

A planar motor can be provided as electromagnetic transportation device. This means that the electromagnetic transportation device is a planar motor. Analogous to FIG. 1a, a simple example of a planar motor as an electromagnetic transportation system 2 is shown in FIG. 1b. In contrast to the long stator linear motor, the planar motor 2 has a transport plane 20 instead of a transport route 20. A large number m of drive coils Sm are arranged in the transport plane 20, here located in the yz-plane. The drive coils Sm are arranged here in the x-axis and the y-axis only by way of example and are each energized with a coil current $i_m$ in normal operation under the control of a control unit 4 (only shown for some drive coils Sm) in order to generate a magnetic field moving in the transport plane 20. The drive coils Sm can also be connected to the control unit 4 in a different manner in order to energize the drive coils Sm with the coil current $i_m$. The control unit 4 can be in the form of suitable hardware and/or in the form of software running on suitable hardware.

A number of sensors S1, S2, S3, S4 are arranged at the planar motor. A magnetic field sensor, for example, can be provided as the sensor S1, S2, S3, S4. Magnetic field sensors can be viewed as sensors which measure a property of a magnetic field, for example the magnetic field intensity (for example a Hall sensor) or the direction of the magnetic field (for example a magnetoresistive sensor).

A current sensor which determines the coil current $i_m$ through a drive coil L can also serve as sensor S1, S2, S3, S4. As is known, a normal force and/or propulsion force acting on a transport unit can be determined from the coil current $i_m$.

According to the invention, an evaluation unit 3 is provided which compares at least one measurement value m1 of a first sensor S1 (only one first sensor S1 is shown as an example in FIG. 1b) with a predefined threshold value G. Thus, the measurement value m1 of the sensor S1 is checked for plausibility, for example, and a deviation of the measurement value m1 from the target value G is identified and an action A is triggered. As action A, for example, a warning signal can be output and/or the control unit 4 of the long stator linear motor can be intervened in. The sensor S1 or the sensors S1, S2, S3, S4 are connected to the control unit 4 by control connections for the transmission of the measurement values m1, m2, m3, m4, wherein the control connections also are connected to the evaluation unit 3 in the figures. A preferably secure bus can also be provided as control connections. The sensors S1, S2, S3, S4 may preferably be connected to the evaluation unit 3 via their own evaluation connection, which is separate from the control connection. This means that the measurement values m1, m2, m3, m4 can be transmitted separately to the evaluation unit 3 via secure lines, which ensures a higher level of security in the evaluation.

A magnetic field variable, such as a magnetic field angle $\alpha 1$ and/or a magnetic field magnitude A1, can be recorded as measurement value m1. A temperature, a current, etc. can also be recorded as a measurement value m1. A temperature can be used, for example, to "correct" values of magnetic field variables if these are influenced by the temperature. A sensor S1 can of course also supply several physical variables as measurement values m1, for example a magnetic field variable and a temperature. A variable derived from the directly physically measured variable can of course also be viewed as a measurement value m1.

Figure 2:
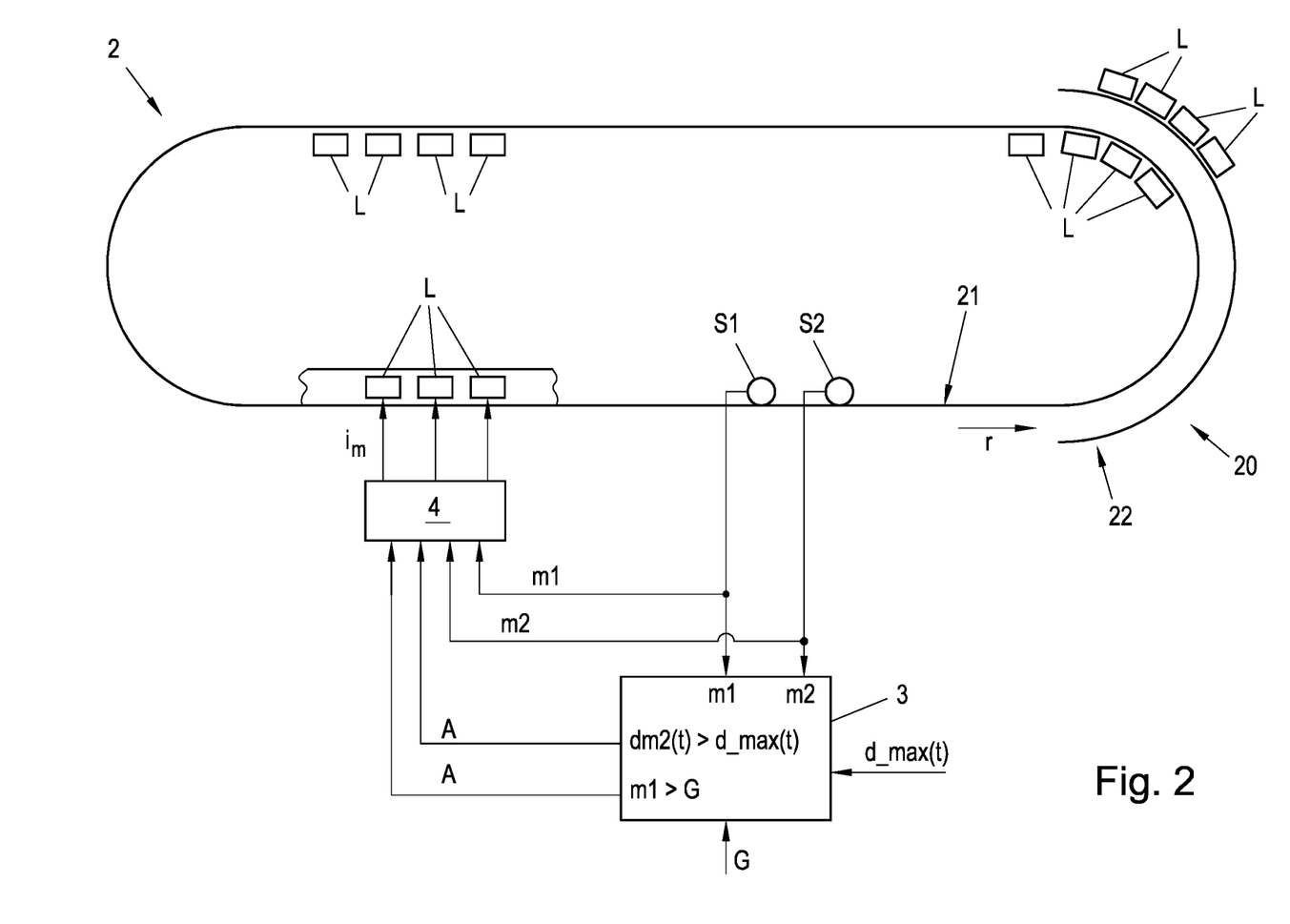
FIG. 2 shows the comparison of the rate of change of a further measurement value with a maximum rate of change.

A rate of change over time $dm1(t)$ of the first measurement value m1 of the first sensor S1 and/or a rate of change over time $dm2(t)$ of a further measurement value m2 of a further sensor S2 can also be compared with a maximum rate of change d_max(t) over time. If the maximum rate of change over time d_max(t) is exceeded, an error is identified and an action A is triggered. This is shown in FIG. 2 and can be used analogously in a planar motor as the electromagnetic transport system 2.

A certain continuity can thus be assumed as the measurement value m1 for a magnetic field angle $\alpha 1$, for example. If the at least one sensor S1 represents a magnetic field sensor, for example, an excessively high rate of change over time of a magnetic field angle $\alpha 1$ and/or the magnetic field magnitude A1 can indicate a faulty sensor S1 or an error in the processing between the sensor and the evaluation unit or in the evaluation unit. The (physically) maximum possible rate of change is preferably provided as the maximum rate of change d_max(t). The dynamics, i.e. a rate of change over time $dm1(t)$, $dm2(t)$ of the measurement value m1, m2, can be viewed and compared with a predefined maximum possible dynamics, i.e. the maximum rate of change d_max(t). For example, a maximum possible rate of change can be established for the magnetic field angle $\alpha 1$, for example within a safety period ts. If a rate of change $dm1(t)$, $dm2(t)$ of the measurement value m1, m2 above the maximum possible rate is detected in the evaluation unit 3, an error can be inferred. Likewise, a rate of change over time $dm1(t)$, $dm2(t)$ of the magnetic field magnitude A1 can be checked as a measurement variable m1, m2, compared with the maximum possible rate of change d_max(t) and, if exceeded, an error can be inferred and an action A triggered.

It can also happen that no major changes in temperature are to be expected. Therefore, a temperature sensor as sensor S1 can also deliver a temperature as measurement value m1, m2 and be compared with the maximum possible rate of change dm1($t$), dm2($t$) of the temperature. The same is of course also possible with other measurement values m1, m2, such as currents, for example.

A rate of change over time dm1($t$) of a measurement value m2 can also be compared with a maximum rate of change over time d_max(t) without comparing the measurement value m1 with a threshold value G. If the maximum rate of change over time d_max(t) is exceeded, an error is also identified in this case and action A is triggered. In this case, the sensor S1 and the measurement value m1 can thus be taken out in FIG. 2 and a safety function can nevertheless be ensured.

Figure 4:
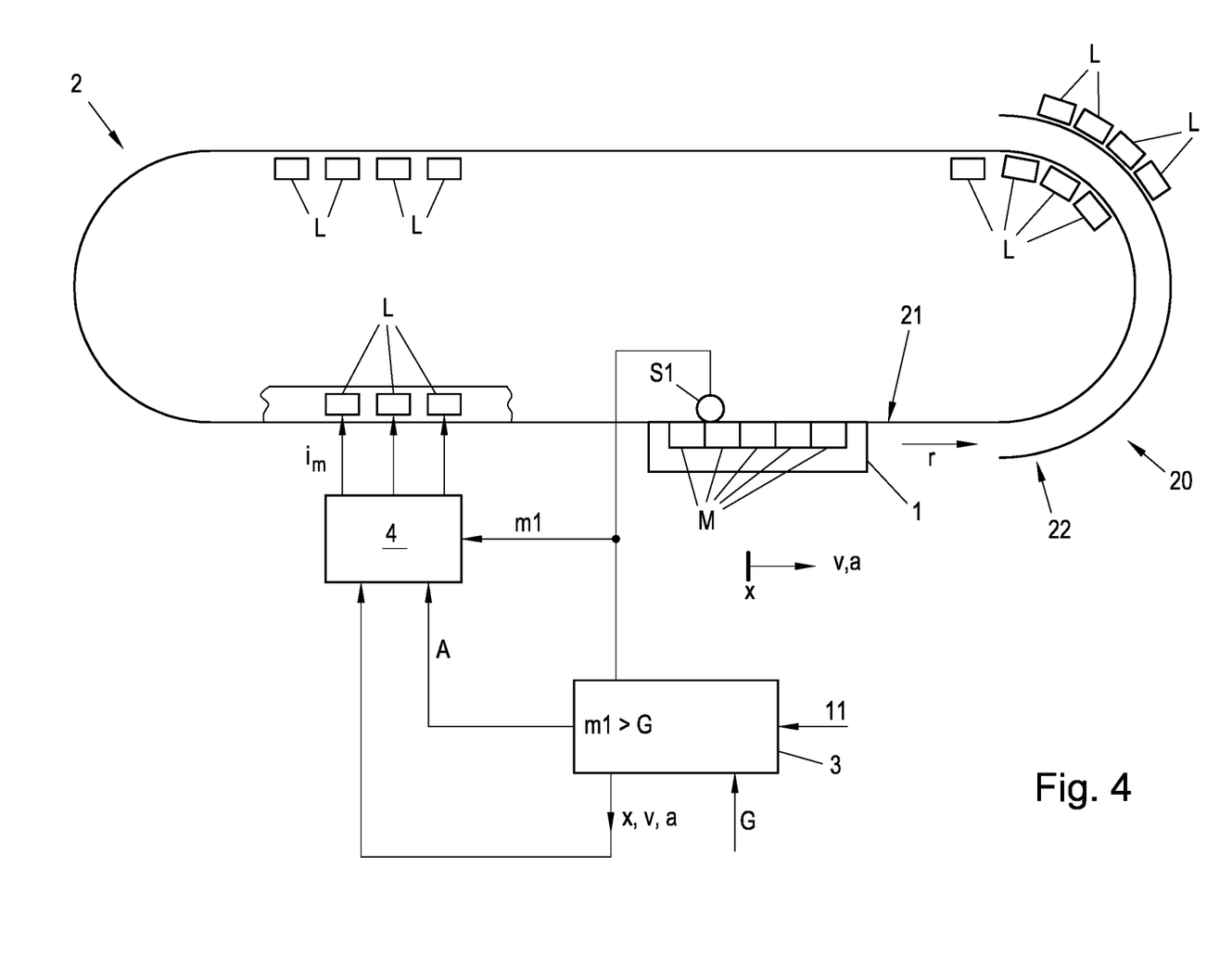
FIG. 4 shows the determination of a safe position/speed/acceleration.

In addition to comparing the first measurement value m1 of the first sensor S1 with a threshold value G, the first measurement value m1 of the first sensor S1 and/or a further measurement value m3 of a further sensor S3 may be compared with an additional measurement value m4 of an additional sensor S4 and in case of a deviation of the first measurement value m1 and/or the further measurement value m3 from the additional measurement value m4, preferably by a tolerance, an error is identified in the evaluation unit 3 and an action A is triggered. In FIG. 4, the first measurement value m1 of the first sensor S1 is compared with a limit value G and the further measurement value m3 of the further sensor S3 is compared with the additional measurement value m4 of the additional sensor S4 and can be used analogously in a planar motor as the electromagnetic transportation system 2. A comparison of the measurement values m1, m3 with additional measurement values m4 is particularly advantageous if the respective sensors S1, S3 are positioned adjacent to the additional sensor s4, since here similar measurement values m1, m3, m4 are to be expected, e.g. similar temperatures and/or similar magnetic field magnitudes.

If magnetic field angles are available as measurement values m1, m3, m4 and if the magnetic field angles of neighboring sensors S1, S3 are similar, then the magnetic field angles can be treated in the same way as similar magnetic field magnitudes, temperatures, etc. If the magnetic field angles of neighboring sensors S1, S3 are not similar to one another, the relationship between the magnetic field angles of neighboring sensors S1, S3 can be known, so that, based on a first magnetic field angle as the first measurement value m1 of the first sensor S1, an expected magnetic field angle can be inferred as the expected further measurement value of a neighboring further sensor S3. If the further measurement value m3 does not agree with the expected further measurement value, an error can be inferred and an action can be triggered.

An expected value of an additional measurement value m4 from an additional sensor S4 can also be calculated on the basis of a measurement value m1, m3 from the first sensor S1 and/or from the further sensor S3.

A further measurement value m3 from a sensor S3 can also be compared with an additional measurement value m4 from an additional sensor S4 and a difference can be determined without comparing the measurement value m1 with a threshold value G. If the determined difference deviates from a predefined difference, preferably from a predefined difference of zero, an error is likewise identified in this case and an action A is triggered. In this case, the sensor S1 and the measurement value m1 can thus be eliminated in FIG. 3.

The evaluation unit 3 is advantageously connected to all sensors S1, S2, S3, S4 of the long stator linear motor or planar motor 2 and compares the measurement values m1, m2, m3, m4 with the respective threshold values G and triggers an action A in the event of a deviation. An evaluation unit 3 can also be provided for a specific number of sensors S1, S2, S3, S4, for example the sensors of a route segment of the long stator linear motor or the sensors of a plane segment of the planar motor 2.

Figure 3:
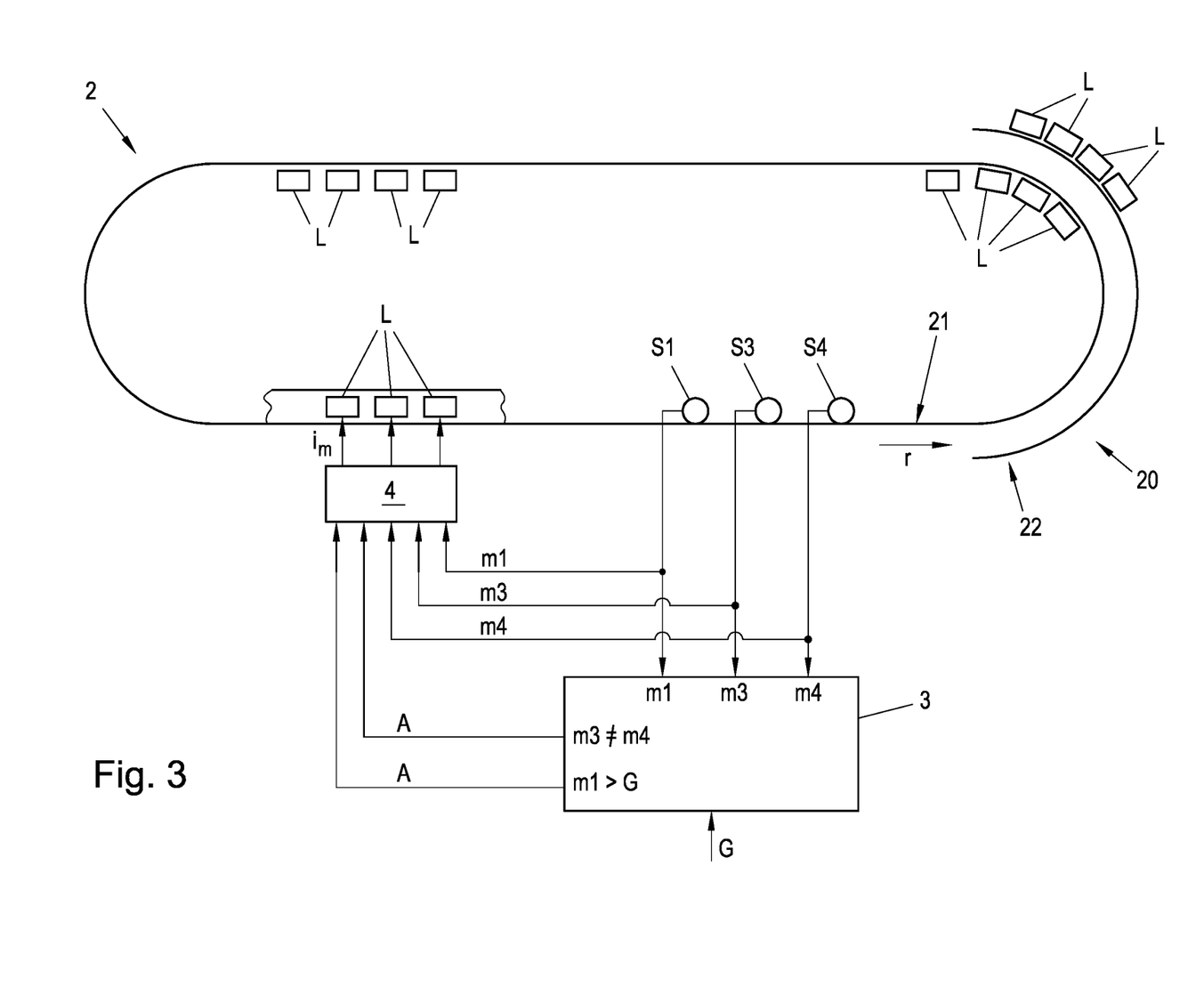
FIG. 3 shows the comparison of a further measurement value with an additional measurement value.

At least one transport unit 1, which can be moved along the transport route 20 in the direction of movement r, is usually arranged on a long stator linear motor 2. For this purpose, the at least one transport unit 1 is guided and held in a suitable manner with guide elements 21, 22 (only indicated schematically in the figures) on the stationary transport route 20 in the direction of movement r. The guide elements 21, 22 can be located on one side of the transport route 20 or on two sides. A transport unit 1 has a number of laterally arranged drive magnets M along the direction of movement r, as shown in FIG. 3. The first number of drive magnets M arranged laterally on the opposite side of the transport unit 1 can also be provided. If the transport unit 1 has drive magnets on two sides, drive coils L can be suitably provided on both sides of the transport route 20 (viewed in the direction of motion r) which interact with the respective magnets M to cause a movement of the transport units 1. For movement, it is preferable to supply only the drive coils L in the region of the drive magnets M with power by the coil controller R, wherein this region can also comprise drive coils L which are located before and/or after the transport unit 1. Of course, more than one transport unit 1 can be moved along the transport route 20, wherein each transport unit 1 can be moved (in direction, position, speed and acceleration) by appropriately energizing the drive coils L near the transport unit 1 independently of the other transport units 1, provided there is sufficient separation between the drive magnets M of the transport units 1.

In a planar motor, the transport unit 1 has magnets M3, M4, which are preferably arranged parallel to the drive coils Sm. In the embodiment shown in FIG. 1b, the magnets M3 are arranged in the x-axis and the magnets M4 are arranged in the y-axis. For movement of the transport unit 1, preferably only the drive coils Sm in the region of the magnets M3, M4 are supplied with power by the control unit 4, wherein this region can also comprise drive coils Sm which are located before and/or after and/or to the side of the transport unit 1. By suitably actuating the drive coils Sm, the transport unit 1 can also be moved in a direction of movement w that is not parallel to one of the axes of the transport plane, as is also shown in FIG. 1b. Of course, more than one transport unit 1 can also be moved in the transport plane, and each transport unit 1 can be moved independently of the other transport units 1 (in direction, position, speed and acceleration) by appropriately energizing the drive coils Sm in the region of the transport unit 1. Current sensors may be provided to determine the position of the transport unit 1 in the transport plane and thus to determine the coils Sm which are currently to be energized and which are located in the transport area 20 at the transport unit 1, for example. Depending on the application and requirements, the transport plane can have any desired shape, and can also be guided in space as desired. Furthermore, the transport plane often consists of a plurality of plane segments arranged next to one another.

Figure 5:
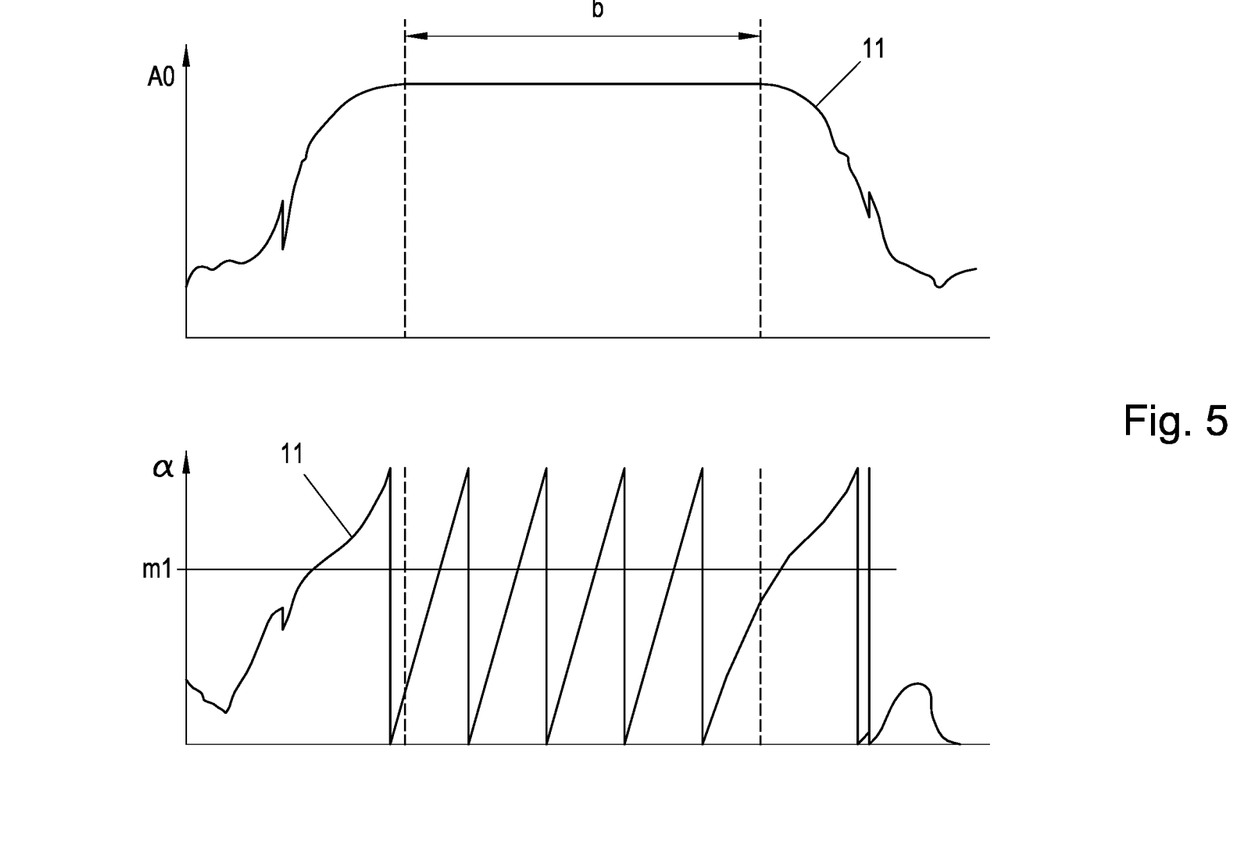
FIG. 5 shows a curve of a characteristic magnetic field angle and a characteristic magnetic field magnitude as reference curves.
Figure 6:
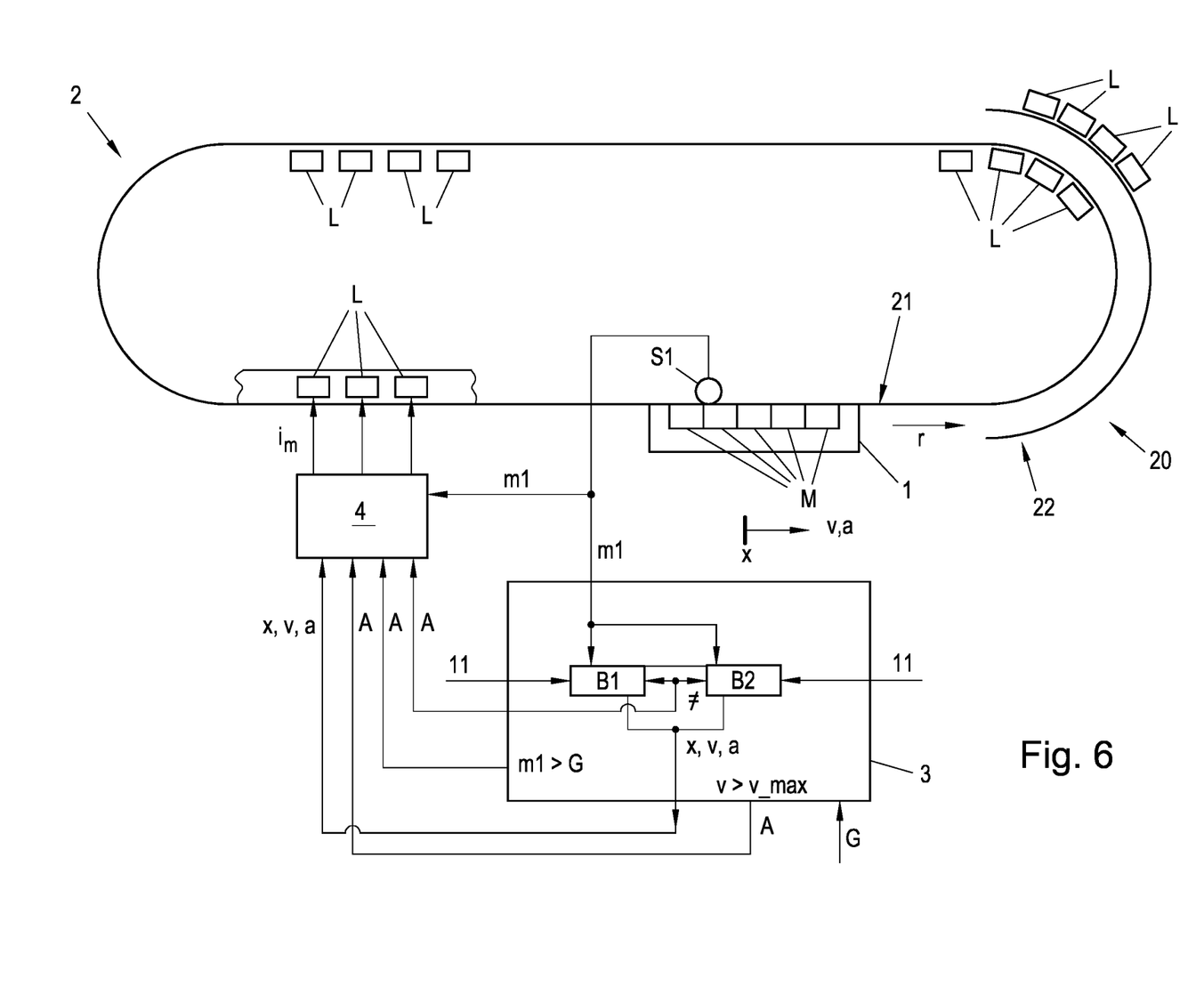
FIG. 6 shows an evaluation unit with two redundant calculation paths.

The propulsion force required to move a transport unit 1 of an electromagnetic transportation system 2 is known to be formed by the propulsive-force-generating current component iq (q-component) of a drive current $i_A$. The drive current $i_A$ corresponds to the vectorial total current of all coil currents $i_m$ of the drive coils Sm acting on the transport unit 1. The transport unit 1 is located at one position and can move in a direction of movement and/or an acceleration in the transport plane 20. Reference is made to FIGS. 4, 5 and 6 to determine the safe position x/safe speed v/safe acceleration a. The method shown in FIGS. 4, 5 and 6 in relation to a long stator linear motor can be used analogously in a planar motor.

If a long stator linear motor is provided as the transportation system, the drive current is a current vector with a q- and a d-component (current component that generates normal force). If a planar motor is provided as a transportation system, the drive current is a current vector with two q-components and one d-component (current component that generates normal force).

Thus, for the normal forward movement of the transport unit 1, the propulsive-force-generating current component(s) iq (q-component(s)) is sufficient. The normal force not serving the forward movement is formed by the normal-force-generating current component id (d-component) of the drive current $i_A$.

A number of sensors S1, S2, S3, S4 are arranged at the long stator linear motor 2, preferably on the stator, i.e. at the transport route 20 of the long stator linear motor 2 or at the transport plane 20 of the planar motor 2, as mentioned. Measurement values m1, m2, m3, m4 of the sensors S1, S2, S3, S4 can be independent of the position of the transport unit 1 at the transport route 20 or in the transport plane 20, in particular if the temperature is used as the measurement value m1, m2, m3, m4.

At least one measurement value m1, m2, m3, m4 of at least one sensor S1, S2, S3, S4 can also be dependent on the position of the transport unit 1. The sensors S1, S2, S3, S4 can be arranged along the transport route 20 or the transport plane 21 for determining the position x and/or the speed v and/or the acceleration a of a transport unit 1. For this purpose, position sensors or speed sensors or acceleration sensors can be provided as sensors S1, S2, S3, S4, which directly transmit the safe position x or safe speed v or safe acceleration a of the transport unit 1 to the evaluation unit 3 as a measurement value m1. For this purpose, the measurement values m1, m2, m3, m4 of the sensors S1, S2, S3, S4 can be compared, for example, with threshold values and/or with further measurement values of further sensors S1, S2, S3, S4 and/or the rate of change over time dm1(t), dm2(t), dm3(t), dm4(t) of measurement values m1, m2, m3, m4 from sensors S1, S2, S3, S4 with specified maximum rates of change d_max(t).

The safe speed v can also be calculated from the safe position x or the time profile of the safe position x. Likewise, the safe acceleration a can also be determined from the safe speed v or the time profile of the safe speed v.

However, magnetic field sensors can advantageously also be provided as sensors S1, S2, S3, S4. A magnetic field caused by the transport unit 1 can thus be supplied as a measurement value m1 to the evaluation unit 3, wherein the evaluation unit calculates a position x and/or a speed v and/or an acceleration a of the transport unit 1. In order to be able to dispense with own, additional position magnets to cause the magnetic field at the transport unit 1, in particular the already existing drive magnets M of the transport unit can be used to cause the magnetic field. The magnetic field can thus be used to determine the safe position x and/or the safe speed v, preferably in the evaluation unit 3.

The at least one measurement value m1, m2, m3, m4 can be compared with a reference value, preferably a reference curve 11, in order to determine the safe position x and/or the safe speed v and/or the safe acceleration a. The known principle of pattern recognition can be used to compare the measurement value m1, m2 with the reference curve 11. FIG. 4 shows a calculation of the safe position x and/or the safe speed v and/or the safe acceleration a on the basis of a measurement value m1 from a sensor S1 and can be used analogously in a planar motor as the electromagnetic transportation system 2.

A magnetic field sensor can convert a magnetic field into an electrical signal in the form of a sin/cos signal, from which a magnetic field angle α1 can be determined using the atan or atan 2 angle function and a magnetic field magnitude A1 using $\mathrm{sqrt}(\sin^2+\cos^2)$. Characteristic magnetic field angles α1 and magnetic field magnitude A1 of a transport unit can thus be viewed as reference curve 11. The course of the reference curve 11, for example a course of a magnetic field magnitude B and a magnetic field angle α, is also repeated for sensors S1, S2, S3, S4 arranged next to one another when the transport unit is moved along the transport route or along the transport plane 20. Depending on the position, different groups of successive sensors S1, S2 are always influenced.

The safe position x and/or speed v and/or acceleration a of the transport unit 1 can thus be determined using a measurement value m1 compared with a reference curve 11.

The reference curve 11 can also be determined in advance from the measurement values m1, m2, m3, m4 of a magnetic field sensor S1, S2, S3, S4 by moving a transport unit 1 along the sensor S1, S2, S3, S4 and recording the measurement value m1, m2, m3, m4.

FIG. 5 shows a typical magnetic field magnitude A0 and a typical magnetic field angle α over the width b of a transport unit 1 (i.e. in the direction of movement r), wherein the edges of the transport unit 1 are shown with broken lines. When speaking of a width b of a transport unit 1, the width across the drive magnets M of the transport unit 1 is of course always meant, since only the drive magnets M cause the magnetic field and can thus be detected. It can also be seen that a transport unit 1, due to scattering processes, generates a magnetic field which extends over the width b. A transport unit can thus also have an influence on a sensor S1, S2 if it is not located directly above it. The typical magnetic field angle α and the typical magnetic field magnitude A can thus serve as reference curves 11.

Since several drive magnets M are provided here, the magnetic field angle α describes a saw tooth. Each saw tooth is assigned to a unique position of a drive magnet M relative to the respective sensor S1, S2, S3, S4. It can thus be seen that the saw teeth of a magnetic field angle α are repeated several times for a sensor S1, S2, S3, S4. If a measurement value m1 is now recorded by a sensor S1, the safe position x or speed v or acceleration a of the transport unit 1 can be determined by determining the first measured magnetic field angle α1, if the measurement value m1 allows an unambiguous conclusion. This can be made possible, for example, by considering the profile of the measurement value over time.

For a measurement value m1 it can happen that no clear conclusion is possible. If the magnetic field angle α1 is used as the measurement value m1, a sensor S1, S2 detects the same magnetic field angle α1, α2 several times for different positions of the transport unit 1, since this is repeated due to the plurality of drive magnets M on a transport unit 1, as shown in FIG. 5. Thus, if necessary, a measurement value m1 cannot be uniquely linked to a safe position x or speed v or acceleration a, in particular if only the current measurement value m1 is considered without the time profile. In addition to the first sensor S1, at least one second sensor S2, preferably all sensors S1, S2, S3, S4 that are assigned to a transport unit at a point in time t, can be used in order to obtain at least one second measurement value m2 in addition to the first measurement value m1. An assignment of sensors S1, S2, S3, S4 to a transport unit 1 can then be established, for example, if the measurement value supplied by the respective sensors varies with the change in the position of the transport unit 1.

From this, for example, several (e.g. two) magnetic field angles α1, α2, several (e.g. two) sensors S1, S2 are determined and viewed as a whole and compared with the reference curve 11, whereby a safe position x or speed or acceleration a of the transport unit 1 can be determined.

When using one measurement value m1 from one sensor S1, but also when using a plurality of measurement values m1, m2 from several sensors S1, S2, it may happen that due to the combination of the measurement values m1, m2 no clear determination of the safe position or speed v or acceleration is yet possible—if several positions of the transport unit 1 are possible by looking at the measurement values m1, m2 together. In particular, using two measurement values m1, m2 can often not be sufficient.

To remedy this problem, information known in advance, preferably information on the arrangement of the drive magnets M and/or on the arrangement of the sensor S1, can also be used to calculate the safe position x and/or the safe speed v and/or the safe acceleration a. Reference is made at this point to AT 519 238 B1, which discloses a method for initial position detection. This document also shows how information known in advance can be used for determining the position. In contrast to AT 519 238 B1, however, the present invention does not determine an initial position of the transport unit 1, but rather a safe position x and/or a safe speed v and/or a safe acceleration a.

For example, starting with the measurement values m1 of the first sensor S1, considering the reference curve 11 and the distances to an adjacent second sensor S2, it can be checked whether the further measurement value m2 of the second sensor corresponds to the expected value (determined from the reference curve 11). The sensor that can be selected as the first sensor S1 is most likely at the center of the arrangement of the drive magnets M, since the profile of the field lines of the magnetic field of the drive magnets M proceeds more favorably in this region. Starting from the first measurement value m1 of the centrally positioned sensor S1 using the reference curve 11, the second measurement value m2 of the second sensor S2 can be checked in order to determine a safe position x of the transport unit 1, possibly using information known in advance.

The measurement values m1, m2, m3, m4 of all active sensors S1, S2, S3, S4 can also be used and compared with the reference curve 11. In order to identify the active sensors S1, S2, S3, S4, it is possible to determine which sensors S1, S2, S3, S4 have a sufficiently strong magnetic field.

The determination of the safe position x and/or the safe speed v and/or the safe acceleration a can take place in the evaluation unit 3 in at least two redundant calculation paths, wherein intermediate results and/or results of the evaluations are able to be compared between the calculation paths. In FIG. 5, the redundant calculation paths are designed as parallel calculation units B1, B2, wherein a comparison of intermediate results and/or results of the evaluations is indicated by a double arrow between the calculation units B1, B2. In the event of deviations, action A can be triggered (indicated by the double arrow), since an error in the evaluation of the measurement value m1 can be inferred.

The safe position x and/or the safe speed v and/or the safe acceleration a of the transport unit 1 can be compared with a predefined maximum value v_max, and if it is exceeded an action A can be triggered. For example, the safe speed v can be compared with a maximum speed v_max.

If, for example, the maximum value v_max is exceeded by the safe speed v of the transport unit 1, then an action A may be triggered by the evaluation unit 3, as also shown in FIG. 6.

The safe position x and/or the safe speed v and/or the safe acceleration a of all transport units 2 of the long stator linear motor or planar motor 2 can be determined. If, for example, the safe speeds v of all transport units 1 located on the long stator linear motor or planar motor 2 are compared with the maximum value v_max, if exceeded a momentum block (STO) can be triggered, which implements a safely limited limit (SLS) for the transport units 1. It is also possible first of all to determine the highest occurring speed of all transport units 1 located on the stator of the long stator linear motor or planar motor 2 and then to compare this value with a predefined threshold value.

Analogous to the above-described determination and processing of the safe position x, speed v and acceleration a, the safe normal force and/or safe propulsion force of a or all of the transport units 1 located on the long stator linear motor or planar motor 2 can be securely calculated directly from a safe measurement value m1 or from a measurement value m1.

The measurement value m1 can be processed further as described in order to obtain a safe normal force and/or safe propulsion force.

For example, two redundant calculation paths B1, B2 for determining the safe normal force and/or safe propulsion force are preferably provided in an evaluation unit 3. As described above, intermediate results and/or results of the evaluations between the at least two redundant calculation paths B1, B2 can be compared. The at least one measurement value m1 can also be compared with a reference value, preferably a reference curve 11, in order to determine the safe normal force and/or safe propulsion force. Furthermore, the safe normal force and/or safe propulsion force can be compared with a predefined maximum value/minimum value, and when it is exceeded/undercut an action A can be triggered.

With reference to FIGS. 4 and 6, it shall be mentioned that, of course, a safe position x and/or safe speed v and/or safe acceleration a are also calculated without comparing the measurement value m1 of the first sensor S1 with a threshold value G.

It can also be considered whether sensors S1, S2, S3, S4 arranged next to one another are meaningfully active. A sensor S1, S2, S3, S4 is considered to be active, for example, when the associated measurement value m1, m2, m3, m4 reaches or exceeds a certain measurement value, for example a certain magnetic field magnitude. A sensor S1, S2, S3, S4 usually detects a magnetic field when the drive magnets M of a transport unit 1 are above or in the vicinity of the sensor S1, S2, S3, S4. Basically, however, stray fields of the drive magnets M must be taken into account, which can act in particular on sensors S1, S2, S3, S4 located upstream or downstream of the transport unit 1. This can be taken into account, for example, via a specified tolerance with regard to the deviation of the expected from the measured magnetic field.

The activity of, in particular adjacent, sensors S1, S2, S3, S4 can thus be compared with predefined patterns in order to carry out a plausibility check. The (non)activity of a first sensor S1 can thus be viewed as a first measurement value m1 and the (non)activity of an additional sensor S4 as an additional measurement value m4 in FIG. 3. On the basis of known expansions of transport units 1 over several sensors S1, S4, it can be assumed that a certain number of sensors S1, S4 must be active in series. If a transport unit 1 covers approximately two sensors S1, S2, then at least two successive sensors S1, S2 must always be active. If only one isolated sensor S1, S2 is active and its two adjacently arranged sensors S1, S2 are not, it can be concluded, for example, that there is a fault in the isolated sensor or in an adjacent sensor S1, S2.

A change in the status of the activity of sensors S1, S2 can also be checked for plausibility. It can be assumed that sensors S1, S2 are activated in groups along the direction of movement r. This means that a sensor S1, S2 can only become active if an adjacent sensor S1, S2 was previously active.

With a suitable geometric arrangement of the sensors S1, S2 and drive magnets M, it can be assumed, for example, that a sensor S1, S2 may only be active at a point in time if one of the surrounding sensors S1, S2 was active before this point in time and still is at this point. Conversely, the assumption can be made that a sensor S1, S2 can only become inactive at a point in time if one of the surrounding neighboring sensors was active before this point in time and still is active at this point in time. If this assumption is not met, an error can be inferred.

It can also be analyzed whether an active sensor S1, S2, S3, S4 actually experiences a magnetic field from a transport unit 1. In this case it can be analyzed which sensors S1, S2, S3, S4 are active, but in whose position no transport unit 1 is located at all. If a sensor S1, S2, S3, S4 measures a magnetic field, although it should not be active at all, it can be assumed that there is an error.

Of course, depending on the detected error, i.e. exceeding or falling below the threshold value of the first measurement value m1, exceeding the maximum rate of change over time dm1, dm2 of a measurement value m1, m2, deviation of the measurement values m1, m2, m3, m4 of various sensors S1, S2, S3, S4, errors when calculating the safe position x/safe speed v/safe acceleration a, or exceeding a maximum value v_max by the safe position a/safe speed v/safe acceleration a, a different action A can be triggered, even if all actions are designated as A in the figures and access the control unit 4.

Although a long stator linear motor is shown as an example in FIG. 2, 3, 4, 6 as an electromagnetic transportation device 2, the method thus described for securely monitoring the function of a long stator linear motor can be applied analogously to a planar motor. The described methods for securely monitoring the function of a long-stator linear motor, which are not shown in the figures, can also be used in a similar manner to the secure monitoring of the function of a planar motor.

Furthermore, the evaluation units described in connection with a long stator linear motor, for example according to FIG. 2, 3, 4, 6, which are designed to compare a first measurement value of a first sensor with a predefined threshold value and to determine an error when the measurement value is exceeded and to trigger an action, can be used in an analogous manner in an electromagnetic transportation device 2 in conjunction with a planar motor.

The invention claimed is:

1. A method for securely monitoring the function of an electromagnetic transport device in the form of a long stator linear motor or planar motor, wherein a number of sensors are arranged at the long stator linear motor or planar motor, the method comprising:
    acquiring for each of the number of sensors a measurement value which is suitable for controlling the long stator linear motor or planar motor;
    comparing at least one first measurement value of a first sensor with a predefined plausibility threshold value;
    when the plausibility threshold value is crossed by the first measurement value, identifying an error and triggering an action;
    comparing a rate of change over time of the first measurement value of the first sensor and/or a rate of change over time of a further measurement value of a further sensor with a predefined maximum rate of change over time; and
    when the maximum rate of change over time is exceeded, identifying an error and triggering an action.

2. The method according to claim 1, wherein the first measurement value of the first sensor and/or a further measurement value of a further sensor is compared with an additional measurement value of an additional sensor and a difference is identified, and
    wherein, if the identified difference deviates from a predefined difference an error is identified and an action is triggered.

3. The method according to claim 2, wherein the additional sensor is positioned adjacent to the first sensor and/or further sensor.

4. The method according to claim 2, wherein an activity of the first sensor is determined as a first measurement value and/or an activity of a further sensor is determined as a further measurement value and an activity of the additional sensor is determined as an additional measurement value.

5. The method according to claim 1, wherein the action comprises the output of a warning and/or an intervention in the control system.

6. The method according to claim 1, wherein a transport unit is arranged movably in a direction of movement along a transport route,
    wherein a plurality of drive magnets arranged at the transport unit in the direction of movement generate a magnetic field at the transport route, or a transport unit is movably arranged in a transport plane,
    wherein a plurality of drive magnets arranged at the transport unit generate a magnetic field at the transport plane, and
    wherein at least one measurement value of at least one sensor is dependent on the position and/or the speed and/or the acceleration of the transport unit at the transport route or at the transport plane.

7. The method according to claim 6, wherein from the at least one measurement value a safe position and/or a safe speed and/or a safe acceleration of the transport unit is/are determined.

8. The method according to claim 7, wherein the safe position and/or the safe speed are identified in at least two redundant calculation paths of an evaluation unit.

9. The method according to claim 8, wherein intermediate results and/or results of the evaluations between the at least two redundant calculation paths are compared.

10. The method according to claim 7, wherein the at least one measurement value is compared with a reference value in order to identify the safe position and/or the safe speed and/or the safe acceleration.

11. The method according to claim 10, wherein information known in advance is used for calculating the safe position and/or the safe speed and/or the safe acceleration.

12. The method according to claim 7, wherein the safe position and/or the safe speed and/or the safe acceleration of the transport unit is/are compared with a predefined maximum value, and, when exceeded, an action is triggered.

13. The method according to claim 7, wherein the safe position and/or the safe speed and/or the safe acceleration of all transport units of the long stator linear motor or planar motor are determined.

14. The method according to claim 1, wherein a transport unit is arranged movably in a direction of movement along a transport route,
wherein a plurality of drive magnets arranged at the transport unit in the direction of movement generate a magnetic field at the transport route, or a transport unit is arranged movably along a transport plane and a plurality of drive magnets arranged at the transport unit generates a magnetic field at the transport plane, and
wherein a propulsion force acting on the transport unit and/or a safe normal force acting on the transport unit is/are determined from the at least one first measurement value.

15. The method according to claim 1, wherein the function of the long stator linear motor or planar motor is monitored when an object or subject is in a predefined safety region of the long stator linear motor or leaves a predefined working region of the long stator linear motor.

16. An electromagnetic transport device in the form of a long stator linear motor or planar motor, comprising:
a controller configured to control the long stator linear motor or planar motor;
a number of sensors arranged on the long stator linear motor or planar motor, which are connected to the controller and are designed to acquire a measurement value of the long stator linear motor or planar motor and to transmit the measurement value to the control unit; and
an evaluation unit designed to:
compare the measurement value with a predefined plausibility threshold value and, when the measurement value crosses the predefined plausibility threshold value, to identify an error and trigger an action, and
compare a rate of change over time of the first measurement value of the first sensor and/or a rate of change over time of a further measurement value of a further sensor with a predefined maximum rate of change over time and, when the maximum rate of change over time is exceeded, identify an error and triggering an action.

17. The method according to claim 2, wherein the predefined difference is a-predefined difference of zero.

18. The method according to claim 10, wherein the reference value is a reference curve.

19. The method according to claim 11, wherein the information known in advance is information on the arrangement of the drive magnets and/or on the arrangement of the at least one sensor.

* * * * *